United States Patent [19]

Hochberg

[11] Patent Number: 4,788,116

[45] Date of Patent: Nov. 29, 1988

[54] FULL COLOR IMAGES USING MULTIPLE DIFFRACTION GRATINGS AND MASKING TECHNIQUES

[75] Inventor: Eric B. Hochberg, Altadena, Calif.

[73] Assignee: Xerox Corporation, Stamford, Conn.

[21] Appl. No.: 846,535

[22] Filed: Mar. 31, 1986

[51] Int. Cl.$^4$ .................. G03C 11/00; G03C 5/00; G03F 9/00

[52] U.S. Cl. ........................... 430/21; 430/22; 430/290; 355/32; 350/162.17

[58] Field of Search ............ 355/32; 350/162.17; 430/21, 22, 290, 321

[56] References Cited

U.S. PATENT DOCUMENTS

| 817,569 | 4/1906 | Ives | 430/21 |
|---|---|---|---|
| 3,947,105 | 3/1976 | Smith | 353/20 |
| 3,957,354 | 5/1976 | Knop | 350/162 SF |
| 4,017,158 | 4/1977 | Booth | 350/3.5 |
| 4,211,918 | 7/1980 | Nyfeler et al. | 235/454 |

OTHER PUBLICATIONS

"Microfiche in Color Mode by Diffraction", Electronics, vol. 49, No. 15, pp. 4E, 6E (Jul. 23, 1976).

"Diffraction Gratings for Color Filtering in the Zero Diffraction Order", Applied Optics, vol. 17, No. 23, pp. 3598–3603 (Nov. 5, 1978).

Primary Examiner—Paul R. Michl
Assistant Examiner—Cynthia Hamilton
Attorney, Agent, or Firm—Franklyn C. Weiss

[57] ABSTRACT

Method and apparatus for full-color reproduction of a continuous tone color picture or scene using multiple diffraction gratings and masking techniques. A properly photosensitized media, containing regular arrays of multiple diffraction gratings (70), is first created using computer-generated masks and an interferometric recording technique. This plate is referred to as the "white grating canvas" master or WGC master. Reflective and/or transmissive replicas of the WGC master are then created. For the reproduction of each unique scene, one of these WGC replicas is selectively masked in order to leave only certain gratings or portions thereof active. Photographic or xerographic means are two possible ways in which the masking might be accomplished. The selective masking of the WGC itself, or an intermediate material which is then laminated in registration with the WGC, is done in such a way as to reproduce the primary color components in the original scene when properly illuminated and viewed.

9 Claims, 11 Drawing Sheets

VIEWING THE GRATING HALFTONE

"HIGH" SPATIAL FREQUENCY

"LOW" SPATIAL FREQUENCY

SHOWING THE SYNTHESIS OF DIFFERENT GRATING FREQUENCIES

SHOWING VERTICAL GRATING CONFIGURATION FOR ROS/XEROGRAPHIC COLOR RECORDING

FULL COLOR IMAGES USING MULTIPLE DIFFRACTION GRATINGS AND MASKING TECHNIQUES

This invention relates to full color reproduction of a continuous tone color picture or image by the use of diffraction techniques in conjunction with at least two possible masking techniques. Both photographic and xerographic masking techniques will be treated here. The reproduction, i.e., the device, consists of a regular array of small planar diffraction gratings of multiple spatial frequencies. The configuration of these arrays is analogous to similar arrays of color halftone dots or color television pixels. However, portions of these diffraction gratings, of either the reflective or transmissive variety, will be selectively blocked, masked or opaqued by either photographic or xerographic means in order to leave the appropriate gratings or portions thereof exposed for the correct color reproduction on a pixel-by-pixel basis. The full color image so created is viewed in white light.

BACKGROUND OF THE INVENTION

In the conventional color halftone picture, or, ofr example, in a color television picture, a continuous family of colors is simulated by the superposition or complementary juxtaposition of three "single color" halftones or "separations". These three colors are often referred to as the three "primaries". For example, there may be a "red" separation, a "blue" separation, and a "green" separation.

In magazine or color print lithography, different primary color dots are deposited on the paper or other medium in various sizes or diameters, so that the human eye integrates these dots and interprets them as various colors depending upon the dot mix. In photography, color negatives are provided which detect the various colors passing through the lens in a reversal process and, when printed, the various colors become viewable by the human eye. In all of these instances, however, the color perceived is due to either the reflective, transmissive, absorptive and/or radiant properties of the media (e.g., toners, inks, dyes, phosphors, pigments, etc.) involved, not the dispersive or diffractive properties.

A co-pending application, Ser. No. 846,523, by the same inventor and to the same assignee, discloses that a full color image is created and is viewable in white light without the aid of colored inks, toners, sources, guns, or phosphors. A full color reproduction of a color picture, image or scene is realized by means of diffraction techniques. The output reproduction consists of a regular array of small planar diffraction gratings of multiple spatial frequencies configured in much the same way as conventional color halftone dots or color television pixels. Each individual grating by itself would produce a relatively monochromatic color sensation. A multiplicity of gratings are then superimposed or co-mingled in such a way as to produce any arbitrary color sensation. (In Ser. No. 846,523, no opaquing techniques are used and new separation masks and a new master must be created for each new original.)

In accordance with the present application, a sheet of reflective or transmissive multiple diffraction gratings (which will appear much as a plain white canvas or paper) is prepared as in said copending application, with, however, no predisposition as for a particular image to be reproduced. The multiple reflective diffraction pixels are then selectively masked by, for example, black marks applied by xerographic or photographic means. The canvas is blackened or opaqued or rendered non-diffracting in such a way as to leave the appropriate grating or portion thereof exposed and functional for the correct color reproduction on a pixel-by-pixel basis.

DESCRIPTION OF THE DRAWINGS

For a more complete understanding of the invention, reference may be had to the following detailed description of the invention in conjunction with the drawings wherein.

DETAILED DESCRIPTION OF THE INVENTION

In this invention, a regular array of three co-planar diffraction gratings is the device on which all full color reproductions will be formed. Under the proper conditions of illumination and viewing, this unique device will appear to be uniformly "white".

The full color reproduction of an image which has been electronically captured will than be played-out onto this special material. On a pixel-by-pixel basis, the proper color rendition obtains by means of the selective opaquing of portions or elements of the three grating arrays.

Figure 1:
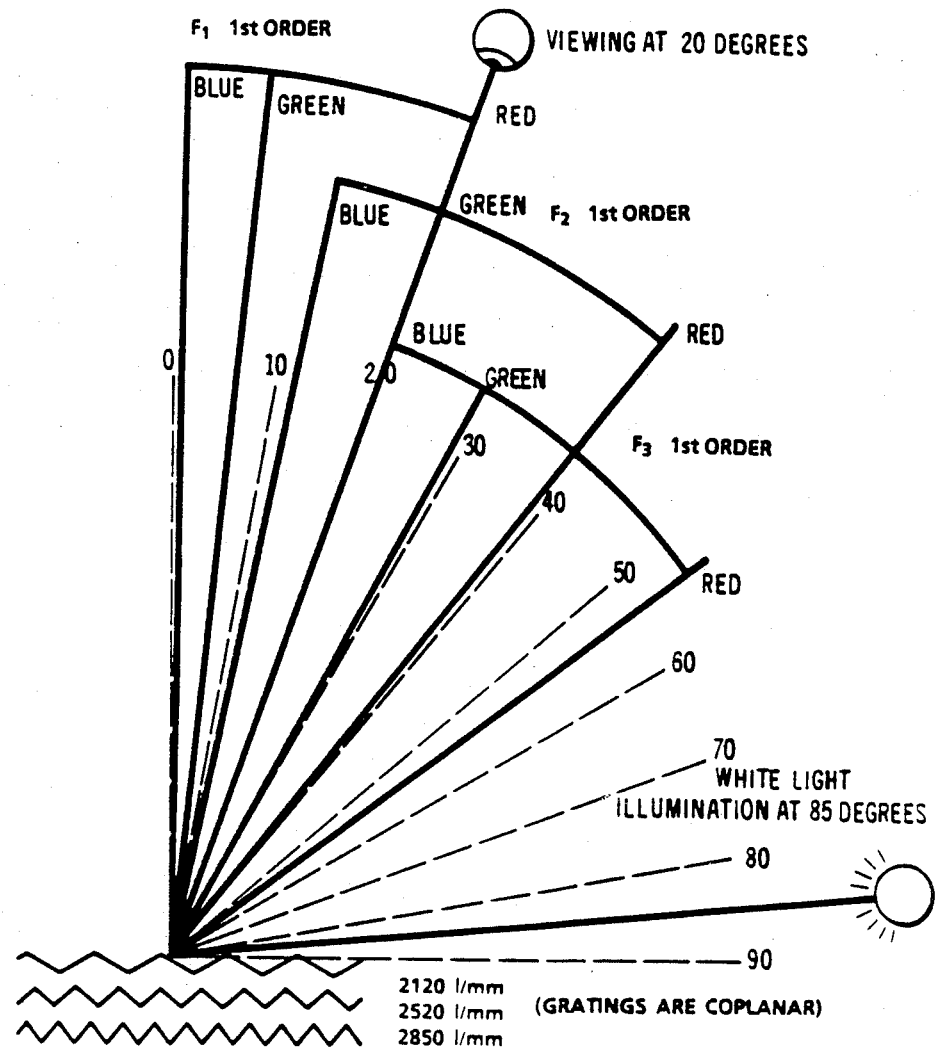
FIG. 1 shows the dispersion characteristic of three coplanar diffraction gratings of the present invention.

FIG. 1 of the present application discloses one variation on the multiple diffraction grating technique of the present invention. F1, F2, and F3 are different reflective diffraction gratings all in the same plane, but not necessarily superimposed over one another.

White light illumination is incident on this device near grazing incidence; e.g., at 85 degrees from the grating surface normal. One then finds three characteristic spectra associated with each of the three grating frequencies. The visible blue-to-red portions of the first-order spectra are shown for each grating in the figure. The gratings have been designed in such a way that at a 20 degree viewing angle the (red) 630 nm light from F1 coincides with both the (green) 530 nm light from F2 and the (blue) 470 nm light from F3.

TABLE 1

| GRATING FREQUENCY 1/mm | illuminaton at 85 degrees DIFFRACTION ANGLE, degrees | | | |
|---|---|---|---|---|
| | RED 630 nm | GREEN 530 nm | BLUE 470 nm | DISPERSION |
| F1 = 2120 | 20 | 7.5 | 0.1 | 20 |
| F2 = 2520 | 36.5 | 20 | 11.0 | 26 |
| F3 = 2850 | 52.9 | 30.9 | 20 | 33 |

In the example described above, an observer positioned at an angle of 20 degrees from the grating normal will, with 85 degree illumination, see a new color which is the combination of the "red" portion of the incident spectrum dispersed by frequency F1 grating areas, the "green" portion of the spectrum dispersed by frequency F2 grating areas, and the "blue" portion of the incident spectrum dispersed by frequency F3 grating areas.

A basic premise in this application is that a "white" color sensation can be produced through the proper combination of the red, green, and blue portions of spectra produced by these three different diffraction gratings. The actual color perceived due to any single grating alone will be dependent upon its grating spatial frequency, its size and shape, its diffraction efficiency and the viewing and illumination conditions. Reviewing the parameters which will influence the appearance of this device are:

the particular observer,
 grating frequency (lines per millimeter),
 grating size and shape,
 grating diffraction efficiency,
 viewing angle,
 viewer distance to device,
 illumination spectral content,
 illumination angle of incidence,
 illumination source size.

The second basic premise is that arbitrary color values can be fabricated through the judicious blackening or opaqueing of portions of the above described multiple diffraction gratings.

Figure 7:
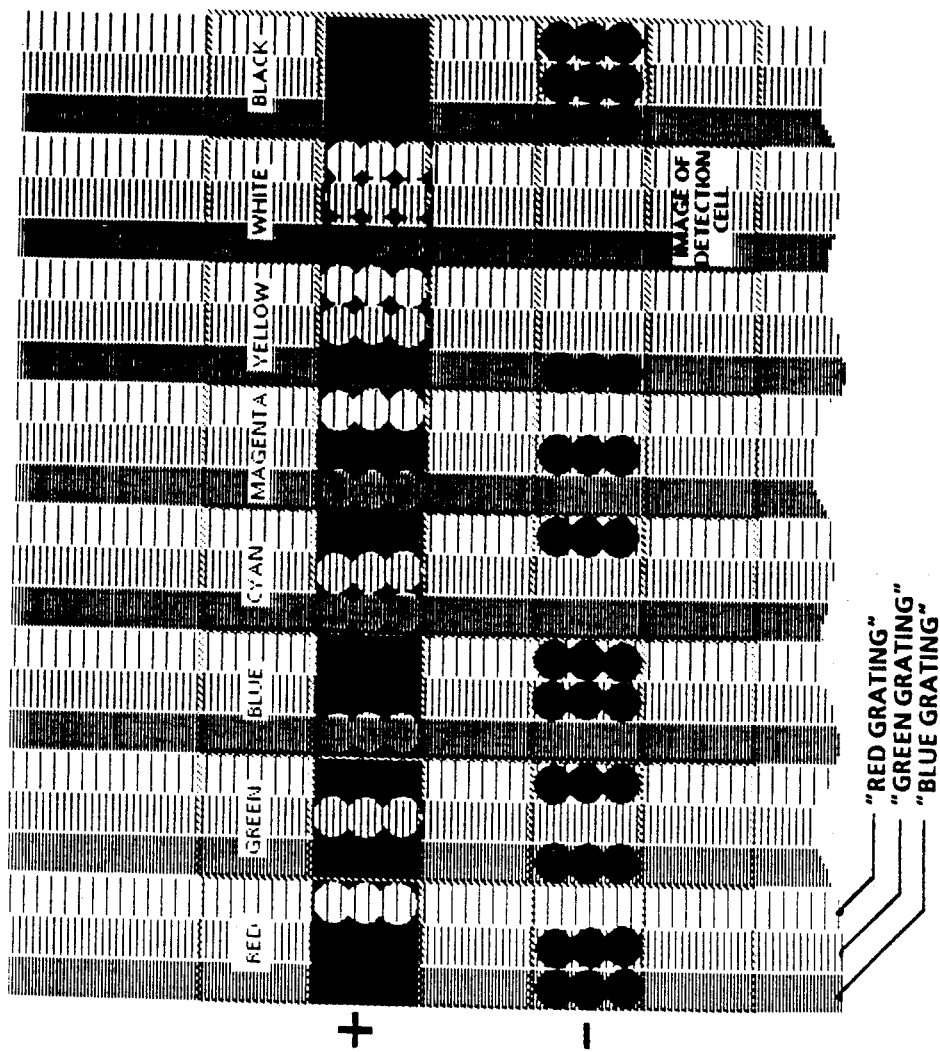
FIG. 7 is a schematic representation of a multiple diffraction grating in a vertical stripe configuration of the present invention.
Figure 8:
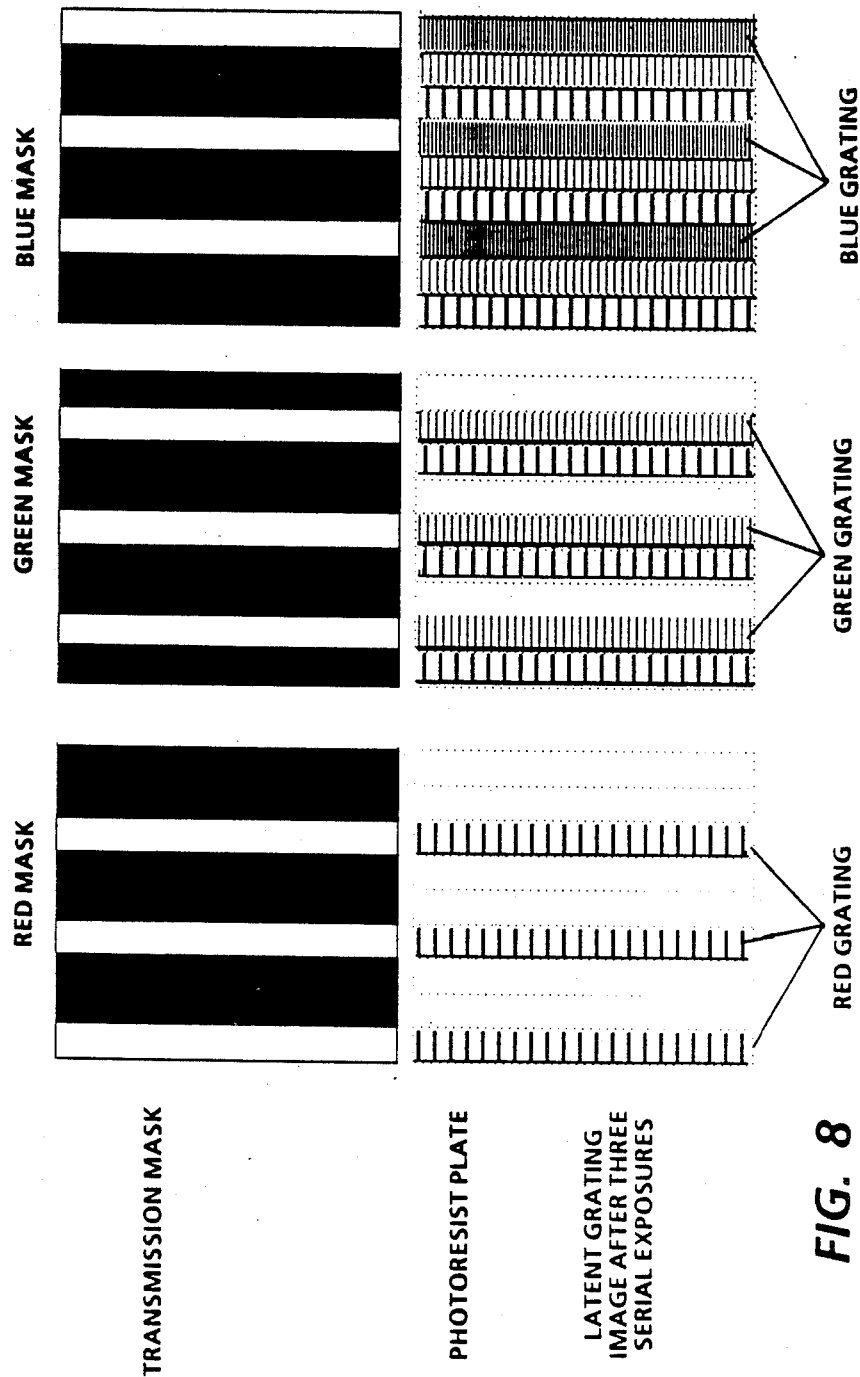
FIG. 8 is a schematic representation of the fabrication of the white grating canvas (WGC) in a vertical configuration for the present invention

The process by which a multiple diffraction grating full color reproduction is created is as follows:

A. Fabricate the WGC master-multiple diffraction grating White Grating Canvas (three different gratings) according to the principles described in said copending application Ser. No. 846,523. This step consists of two sub steps:
 1: create grating separation masks
 2: record gratings interferometrically through separation masks Fabrication of the three color separation masks—may be created from either conventional artwork, or may be computer-generated. In order to produce for example a vertically-oriented array of the three primary gratings, such as seen in FIG. 7, the "separation mask" is straightforward and would look much as in FIG. 8. These three transmission masks delineate which areas on the plate get which gratings. It is noted that in this application, the gratings will not overlap but will fall side by side on the plate.

That is, as in television color techniques, certain areas are designated for "red grating" only, others for "green grating" only, and the rest for "blue grating". These three separations are termed as being "complementary". It is noted that the spatial frequency of the half-toning screen is effectively reduced, that is, made coarser by this approach.

Figure 6:
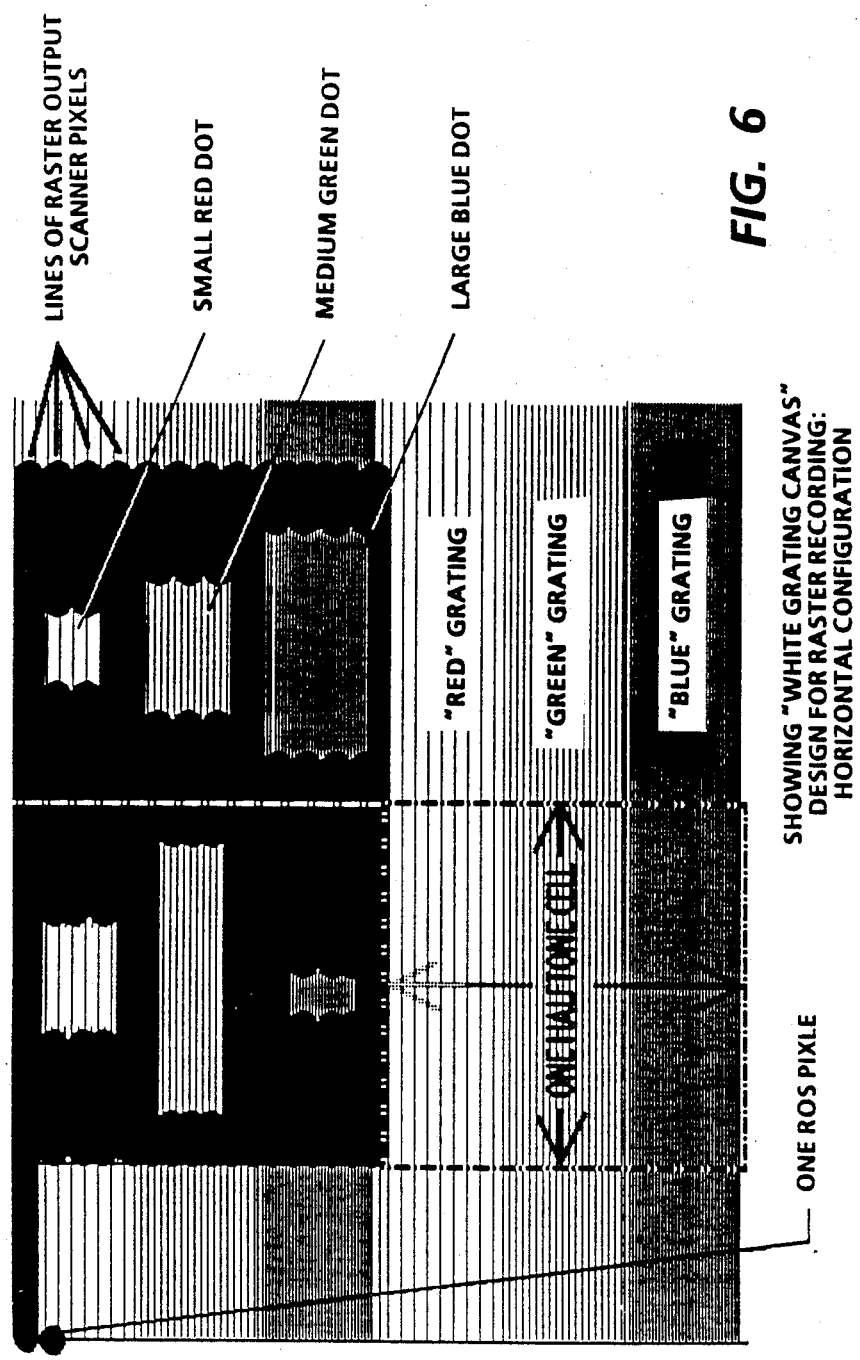
FIG. 6 is a schematic representation of a multiple diffraction grating in a horizontal stripe configuration of the present invention.
Figure 9:
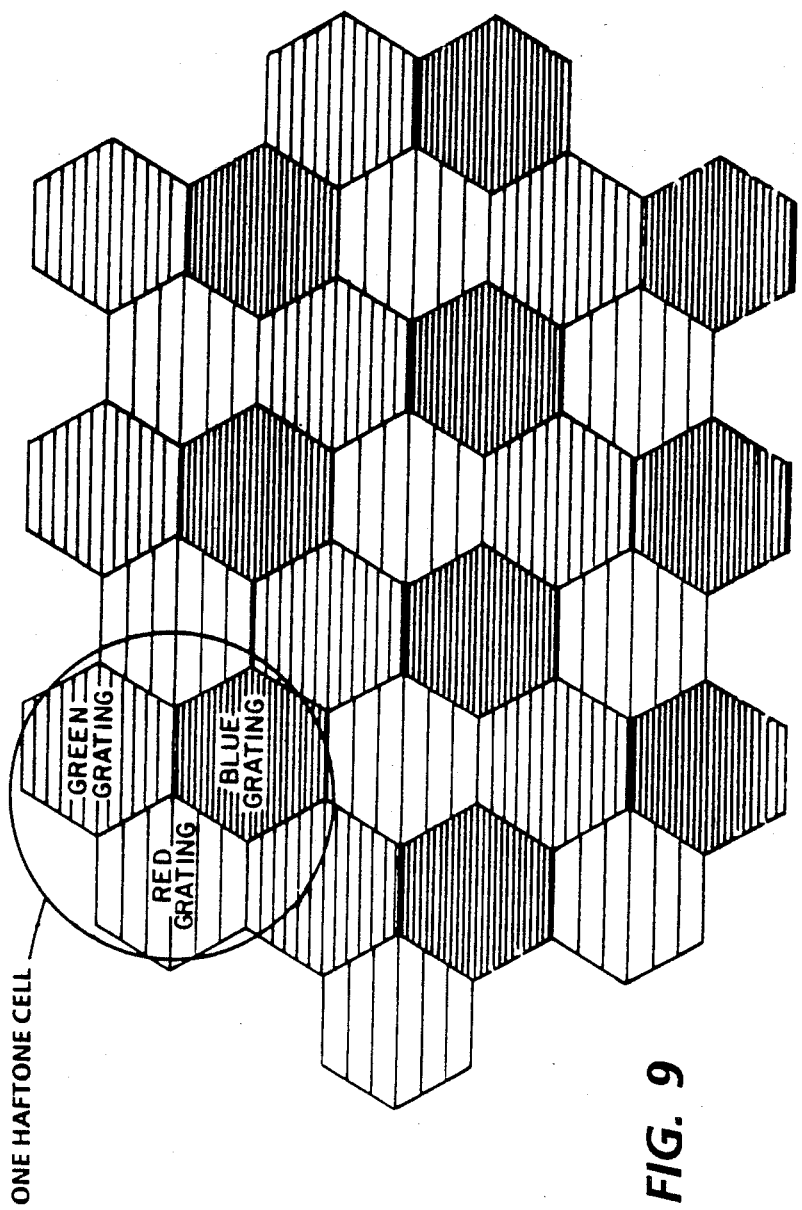
FIG. 9 is a schematic representation of three diffraction gratings arrayed in a hexagonal configuration.

FIG. 6, FIG. 7 and FIG. 9 show three possible complementary grating arrays. It is noted that when any two masks are superimposed in registration there is no transmission.

Fabrication of the WGC master

Figure 5:
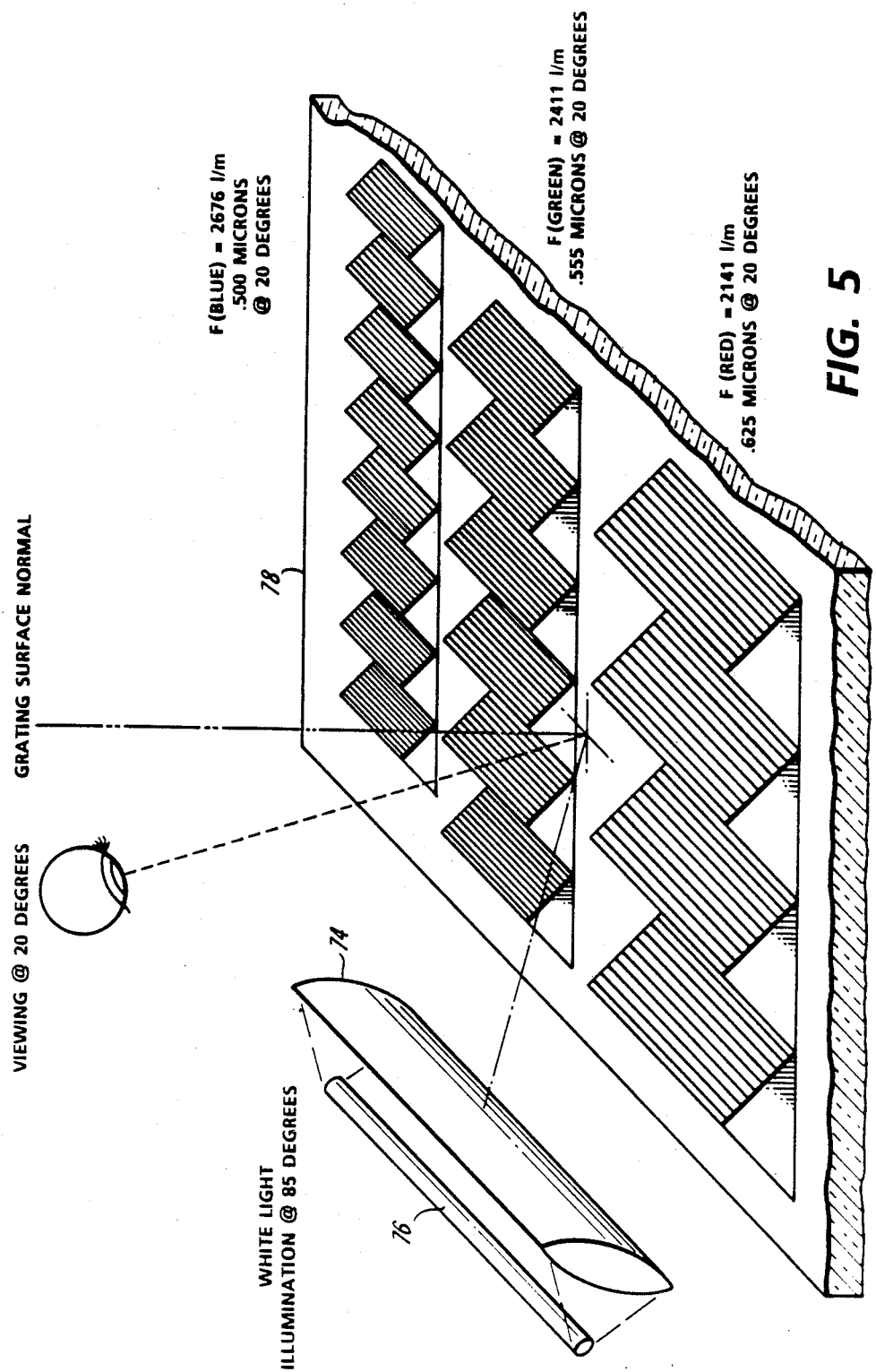
FIG. 5 is a schematic representation of a person viewing a multiple diffraction grating prepared in accordance with the present invention.

Fabrication of the WGC master is the next step. (When properly illuminated and viewed, this master, and all subsequent final replicas will appear as a uniformly bright white plane.) It is assumed that for purposes of the invention herein, that the master is recorded on a positive-working photoresist. In the particular embodiment described above, the diffraction gratings are all oriented in the same direction so as to disperse light in the same plane. Reference is made to FIG. 5.

The WGC consists of regular arrays of three different gratings. FIG. 6, and FIG. 7. These gratings are recorded in three serial interferometric exposures through different transmission masks.

Figure 2:
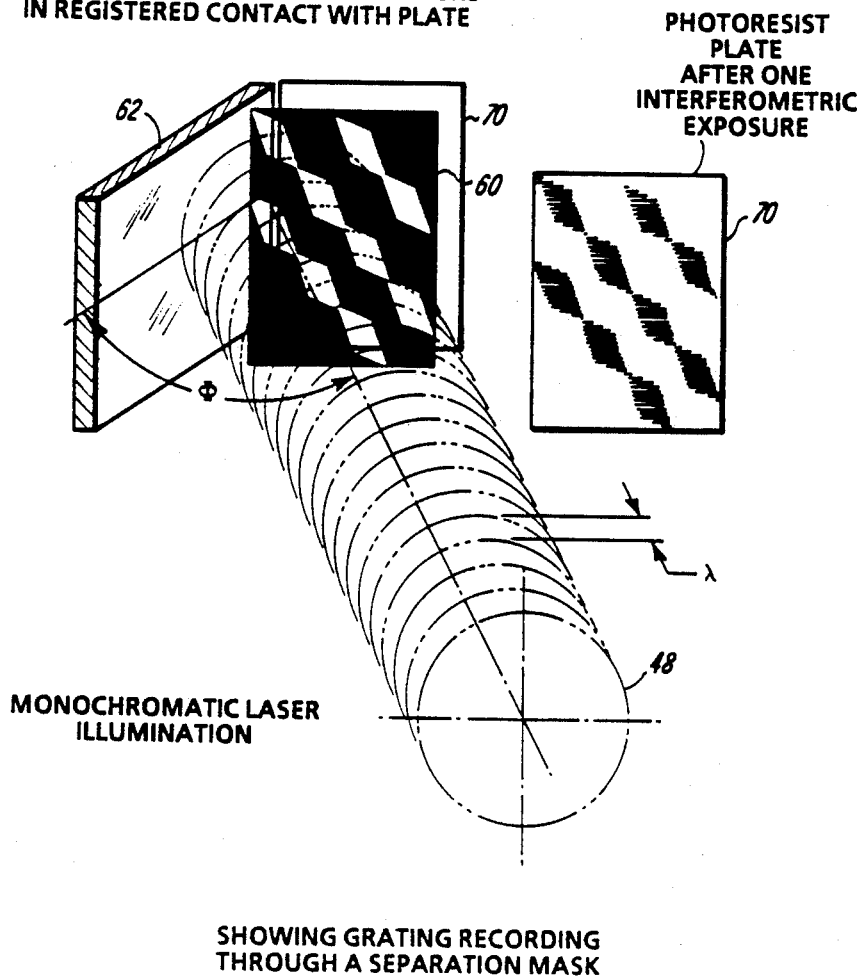
FIG. 2 is a schematic diagram of the present invention utilizing a Lloyd's mirror arrangement to record the multiple diffraction grating color reproduction.

On a single properly photosensitized plate 70, FIG. 2, with the appropriate photosensitive coating, an interferometric diffraction grating exposure 60 (holographic) is made through each of the lithographic type transmission/separation masks 60 described above. A "Lloyd's mirror" arrangement 62 in conjunction with a vacuum platen, not shown, as shown in FIG. 2 can be used to easily "impress" a different diffraction grating through each of the three masks. The masks are used in registered contact with the photosensitive coating. In this example, three masks would require three separate, registered, exposures. The photosensitive plate is then developed to convert the multiple diffraction grating latent images into surface relief diffraction gratings.

Figure 3B:
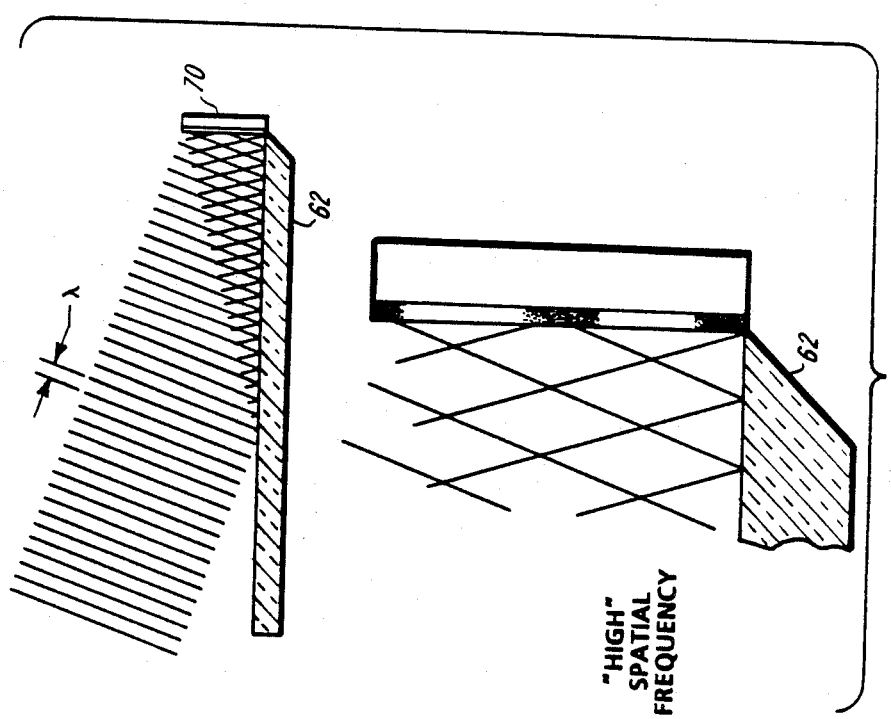
FIGS. 3A and 3B are schematic diagrams of the synthesis of the different grating frequencies utilizing the Lloyd's mirror arrangement.
Figure 3A:
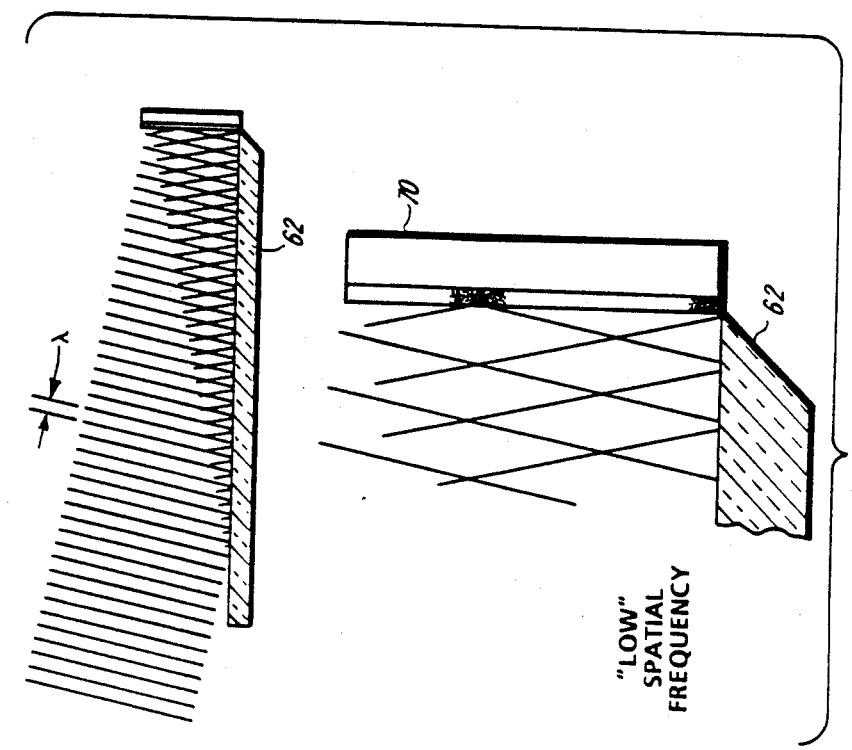
Figure 4:
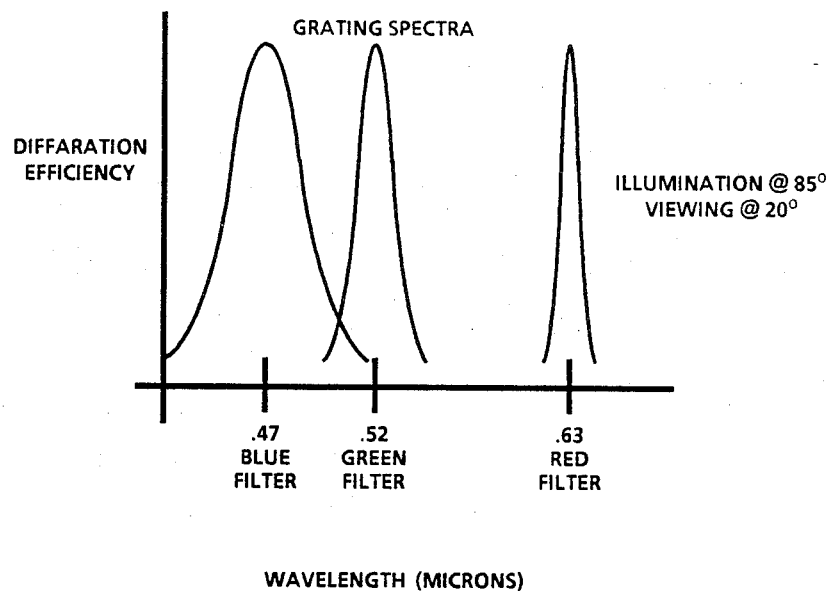
FIG. 4 shows the spectral response of the gratings.

The Lloyd's mirror arrangement is one method by which the gratings can be recorded. Such an arrangement creates interference between two monochromatic beams derived from the same laser. These interference patterns consist of very high spatial frequency "fringes", bands of light and dark. These illumination variations will ultimately be converted into periodic surface relief patterns which will exhibit diffraction effects. See FIGS. 3A and 3B.

Proper chemical development results in a WGC master plate 70 containing the three diffraction gratings as a surface relief pattern in the photoresist. This photresist-coated plate, without any reflection enhancing coatings will exhibit perceptible amounts of diffraction, amounts sufficient to enable the prediction of the performance of the final replicated product.

The exposure, development, and replication processes will be optimized with respect to grating diffraction efficiency and with due consideration to the following parameters:
 grating type: either reflection of transmission,
 viewing and illumination angles,
 wavelength of interest.

B. Electroform replicas: Use standard electroforming techniques to create many reflective WGC replicas.

Conventional nickel electroforming and embossing on clear or aluminized mylar techniques may now be applied to make white grating canvas replicas from the above master. These are the same techniques currently being used to make reflective hologram replicas. These flexible sheets of embossed mylar, either aluminized or clear, may now be used to create full-color image reproductions.

C. Image decomposition: On a pixel-by pixel basis, decompose color image to be reproduced into a collection of black marks. At the end of this step one has stored an electronic bit map file.

Knowledge of the WGC design is necessary to insure that the mating array of black opaquing marks can correctly register with the WGC and provide the correct color rendition. Once the WGC design is defined, a computer program can be written which de-composes the original color content in the original scene on a WGC-pixel-by-pixel basis and decides where the black-/opaque marks must fall. These marks, when registered with the WGC, act to block those grating primary colors or fractions thereof which do not contribute to the color value being rendered.

Figure 10:
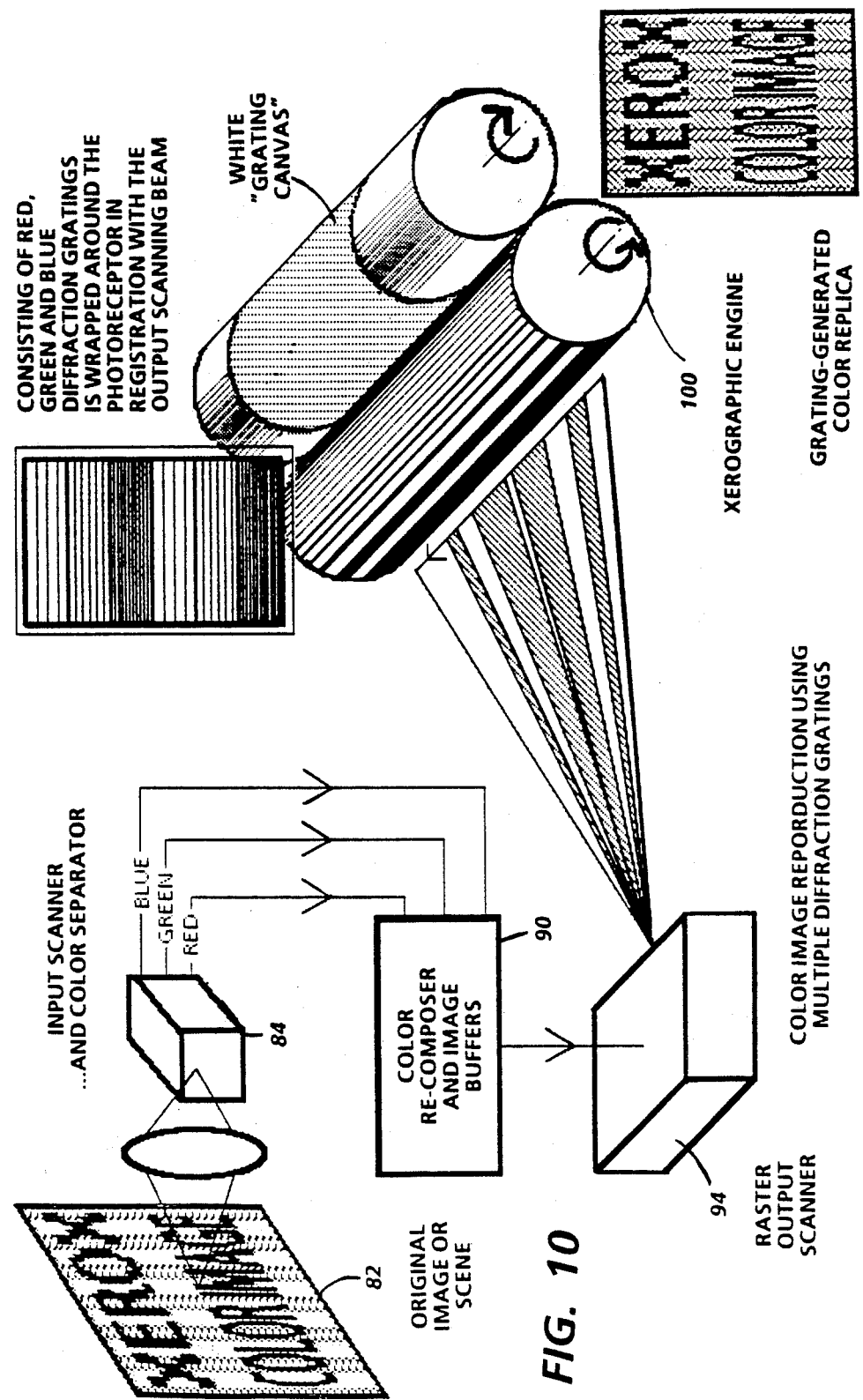
FIG. 10 is a representative drawing showing the overall principles of the present invention.

The colored object or scene 82 which is desired to be reproduced is first decomposed into three primary color signals by one of a few possible means, FIG. 10. A color video camera 84 or color laser input scanner are two such means. In raster fashion, on a pixel by pixel basis, the color video camera decomposes the image or scene into three video signals, typically, red, green, and blue, representing the primary component colors. If desired, an electronic bit map file, perhaps of an intermediate nature may be generated here.

These three signals must then be reconstituted, i.e., processed, 90, with due consideration to: (1) the detailed design of the grating canvas that will be the playback media on which the black marks will be placed (a hexagonal array and a straight stripe array are two possible configurations shown in FIG. 8 and FIG. 9) and (2) the opaquing mechanism, 100, (either a laser raster output scanner or ROS, 94 mated to a xerographic marking engine, or a more conventional masking technique using photographic methods) which will selectively cause the blocking of the gratings or portions thereof. After this re-composition is done, the final bit map file representing a special array of black marks is created.

D. Make opaque black marks: In registration with the WGC, this file of opaque black marks is recorded or played back either directly onto the WGC using xerographic marking methods, or onto an intermediate clear material using photographic or xerographic marking methods. Then, in registration with the WGC, the intermediate clear material is superimposed and laminated to the WGC.

After processing, this file is "played-out" to a raster output scanner 94 (ROS) mated to a xerographic marking engine, or a more conventional masking technique using photographic methods, FIG. 10, in such a way as to (1) selectively mask those portions in the original scene that are truly black, and (2) selectively mask those elemental gratings whose primary color is not a component of the color in the original scene.

By selectively occluding or masking the appropriate grating pixels, arbitrary colors, both spectral and non-spectral, can be created. The tonal value of a "cell", its brightness or luminance, can also be controlled in this way.

For example, if any two of the three primary gratings are completely blocked within a cell, then only the one remaining monochromatic primary color will appear, i.e., red, green, or blue. If only one grating type is blocked, then the superposition of the remaining two primaries will give a color sensation within the subtractive primary family, that is, cyan, magenta, or yellow. And, if no grating is blocked, the original "white canvas" will be apparent. See FIG. 7.

Figure 11:
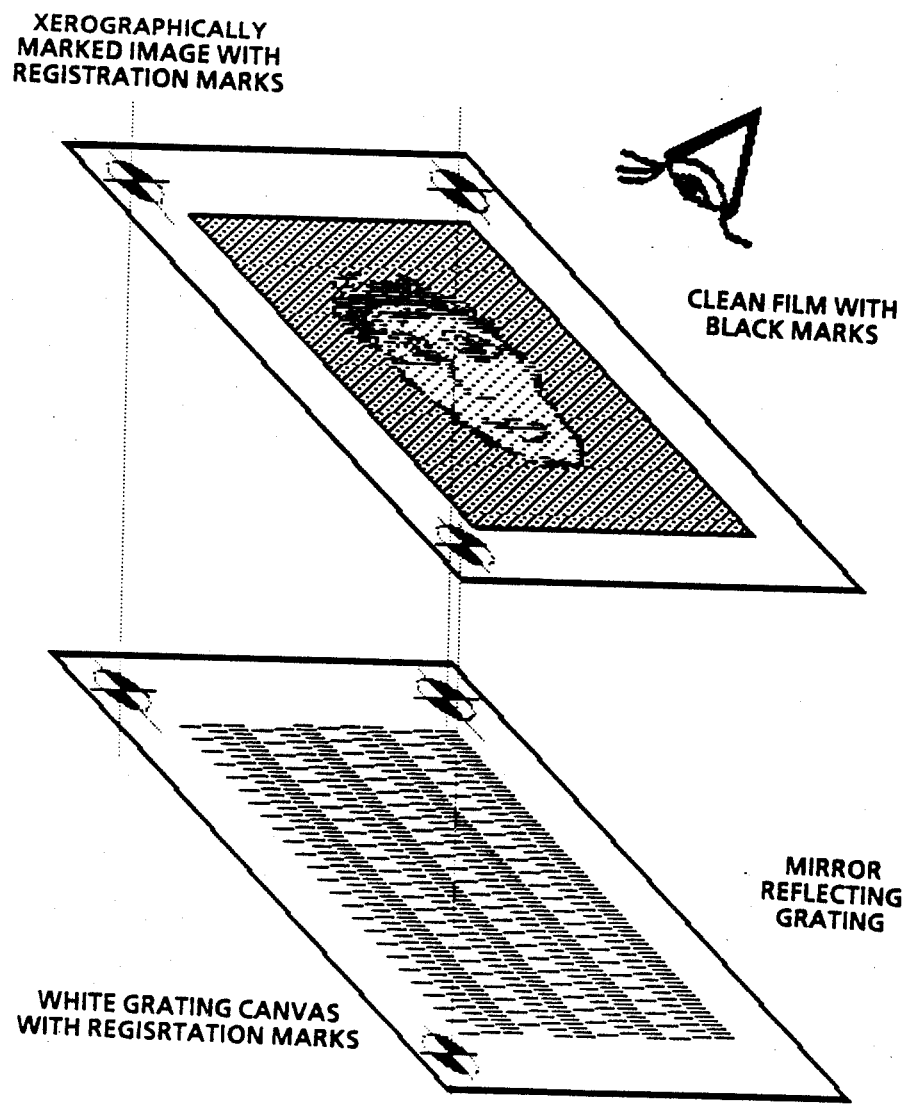
FIG. 11 is schematic representation of the registration of the grating-blocking transmission mask over the white grating canvas.

Obviously, a high degree of registration accuracy between the grating canvas and the xerographic marking engine is necessary in order to insure that the proper elemental gratings will be masked. One possible method by which this registration problem could be relaxed would be to record the blackening marks on a piece of clear material with registration marks rather than writing directly onto the white grating canvas. See FIG. 11.

This piece of clear material is then placed on top of the reflective white grating canvas or to the back of transmiting WGC, both of which will include registration marks identical to those on the WGC. The two are then laminated together.

In so doing, the registration problem is removed from the marking engine.

E. Illumination and Viewing: The final result when properly viewed and illuminated will, on a pixel-by-pixel basis, leave the same color value seen in the original image.

In FIG. 5, a linear, white light line source of illumination 76 is shown. A long tungsten filament lamp would be such a source. Cylindrical collimation optics 74 are schematically shown. These would be designed to provide a collimated flood of white light onto the grating halftone 78 at a single narrow angle of incidence. In FIG. 5, the angle of incidence of the white light shown is approximately 85 degrees as calculated in the above examples. The WGC is of the reflective type; in the transmissive type, the illumination would be on the other side of the WGC.

Some very important applications of the present invention include:

1. Novel Halftone: Insofar as the novel halftone application described above would be virtually impossible to reproduce by conventional printing methods, such as lithography or xerography, it offers a unique method of counterfeiting protection.

Application of the device's principles and techniques described in the embodiment of this application makes viable the following scenario: a system can be designed which can reproduce conventional color images or scenes in the form of the novel grating produced color halftones. Key components of the system are (1) an input scanner/color separator, (2) a color reprocessor, (3) the opaquing engine (may be xerographic and would include laser output scanner) and (4) the white grating canvas material of either the reflective or transmitting type.

Since the appearance of this sort of halftone is strongly dependent upon the viewing conditions, specifically the spatial arrangement of the light source, halftone, and observer, this characteristic might also be exploited to unfold another layer of (metrological) information into the image. For example, if under the optimized viewing conditions, the scene shows a red colored stop sign, departures from the optimum viewing condition will cause the stop sign to change color. Since the change in color with viewing condition change can be predicted, this knowledge gives the viewer information as to where he stands relative to the optimum position. The perceived color of the sign thus gives the viewer feedback as to his position. Position, distance, angle, direction, and other metrological applications are further discussed below.

2. Color synthesis: any visible color can, in principle, be synthesized by the addition of at least two spectral colors. By exploiting the dispersion characteristics of a plurality of linear diffraction gratings in a common plane as described above, virtually any color can be synthesized without the aid of inks, toners, special phosphors, etc.

3. Metrology: The characteristic one-to-one mapping or correlation between wavelength and dispersion angle of the linear diffraction grating is exploited for metrological purposes or applications. Normal spectral dispersion phenomena exhibited by a linear diffraction grating is used to encode metrological information such as angle, direction, and/or distance. The apparent color perceived by the observer is visual feedback information which can be correlated to the metrological parameter of interest.

4. Navigation, surveying, range finding, position sensing are some of the applications where direction and distance information could be encoded and decoded by spectral dispersion means described above. The Lloyd's mirror mastering technique described above is a particularly powerful way to synthesize these unique halftones with a wealth of spatially and spectrally detailed information.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of full-color reproduction of continuous-tone color pictures, images or scenes by the use of diffraction grating techniques comprising:
   creating individual separation masks which delineate areas or zones dedicated to the reproduction of each of the primary colors,
   exposing a single photosensitive plate with an interference pattern representative of a primary color through each of said individual separation masks to form multiple diffraction grating latent images on said photosensitive plate,
   developing said photosensitive plate to convert said multiple diffraction grating latent images into surface relief diffraction gratings,
   replicating said photosensitive plate where the replicas exhibit the same diffraction effects of said plate, and
   selectively causing gratings or portions thereof on the plate or a replica to be masked in order to leave the gratings or portions thereof all or partially diffracting so as to further render said plate or said replica into a unique pattern of active and inactive diffraction gratings reproducing the original colors in the original scene, image or picture.

2. The method as set forth in claim 1 further comprising illuminating said photosensitive plate or said replicas so as to reveal the original colors in the original scene or picture.

3. The method as set forth in claim 2 further comprising placing the illumination source at a predetermined angle to said photosensitive plate or to said replica and viewing said diffracted light at a second predetermined angle so as to reproduce the colors in the original color picture, image or scene.

4. A method of full-color reproduction of continuous-tone color pictures, images, or scenes by the use of diffraction grating techniques comprising:
   creating individual separation masks which delineate areas or zones dedicated to the reproduction of each of the primary colors,
   exposing a single photosensitive plate with an interference pattern representative of a primary color through each of said individual separation masks to form multiple diffraction grating latent images on said photosensitive plate,
   developing said photosensitive plate to convert said multiple diffraction grating latent images into surface relief diffraction gratings, and
   selectively causing gratings or portions thereof on the plate to be masked in order to leave the gratings or portions thereof all or partially diffracting so as to further render said plate into a unique pattern of active and inactive diffraction gratings reproducing the original colors in the original scene, image, or picture.

5. The method as set forth in claim 4 further comprising replicating said photosensitive plate where the replicas exhibit the same diffraction effects of said plate.

6. A method of full-color reproduction of continuous-tone color pictures, images, or scenes by the use of diffraction grating techniques comprising:
   creating individual separation masks which delineate areas or zones dedicated to the reproduction of each of the primary colors,
   exposing a single photosensitive plate with an interference pattern representative of a primary color through each of said individual separation masks to form multiple diffraction grating latent images on said photosensitive plate,
   developing said photosensitive plate to convert said multiple diffraction grating latent images into surface relief diffraction gratings,
   replicating said photosensitive plate where the replicas exhibit the same diffraction effects of said plate, and
   selectively causing gratings or portions thereof on the replica to be masked in order to leave the gratings or portions thereof all or partially diffracting so as to further render said replica into a unique pattern of active and inactive diffraction gratings reproducing the original colors in the original scene, image, or picture.

7. A method of full-color reproduction of continuous-tone color pictures, images, or scenes by the use of diffraction grating techniques comprising:
   creating individual separation masks which delineate areas or zones dedicated to the reproduction of each of the primary colors,
   exposing a single photosensitive plate with an interference pattern representative of a primary color through each of said individual separation masks to form multiple diffraction grating latent images on said photosensitive plate,
   developing said photosensitive plate to convert said multiple diffraction grating latent images into surface relief diffraction gratings,
   replicating said photosensitive plate where the replicas exhibit the same diffraction effects of said plate,
   separating a color picture, image, or scene into its primary component colors, and
   selectively causing gratings or portions thereof on the plate or a replica to be masked in order to leave the gratings or portions thereof all or partially diffracting so as to further render said plate or said replica into a unique pattern of active and inactive diffraction gratings representative of the primary component colors in the original scene, image, or picture.

8. The method as set forth in claim 7 further including illuminating said photosensitive plate or said replicas so as to reveal the original colors in the original picture, image, or scene.

9. A method of full-color reproduction of continuous-tone color pictures, images, or scenes by the use of diffraction grating techniques comprising:
   generating a photosensitive plate means comprising multiple diffraction grating latent images thereon, said latent images delineating interference pattern areas or zones dedicated to the reproduction of each of the primary colors,
   developing said photosensitive plate means to convert said multiple diffraction grating latent images into surface relief diffraction gratings,
   replicating said photosensitive plate means where the replicas exhibit the same diffraction effects of said plate means, and
   selectively causing gratings or portions thereof on the plate means or a replica to be masked in order to leave the gratings or portions thereof all or partially diffracting so as to further render said plate means or said replica into a unique pattern of active and inactive diffraction gratings reproducing the original colors in the original scene, image, or picture.

* * * * *